C. C. FARMER.
FLUID PRESSURE BRAKE DEVICE.
APPLICATION FILED NOV. 24, 1920.
1,432,449. Patented Oct. 17, 1922.
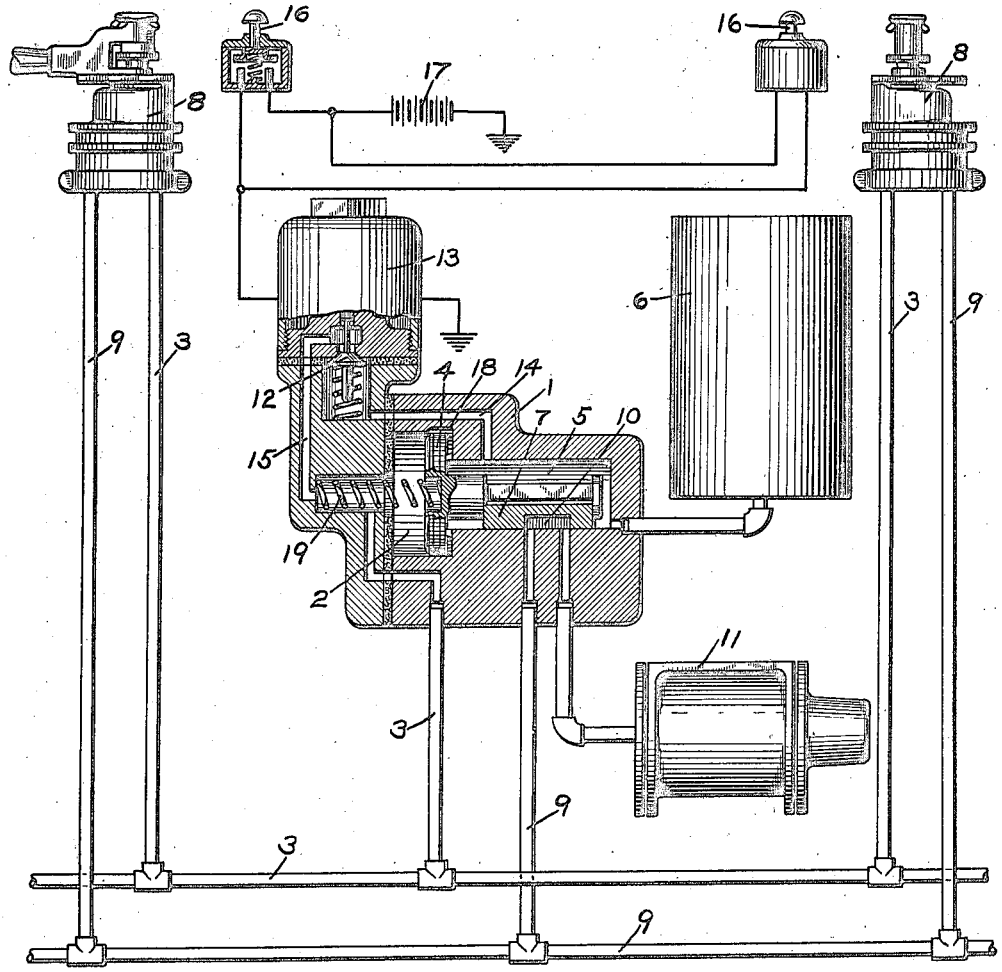
INVENTOR
CLYDE C. FARMER
BY
ATTORNEY Patented Oct. 17, 1922.

1,432,449

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE-BRAKE DEVICE.

Application filed November 24, 1920. Serial No. 426,275.

*To all whom it may concern:*

Be it known that I, CLYDE C. FARMER, a citizen of the United States, residing at Edgewood, in the county of Allegheny and State of Pennsylvania, have invented new and useful Improvements in Fluid-Pressure-Brake Devices, of which the following is a specification.

This invention relates to fluid pressure brakes, and more particularly to means for releasing the brakes.

It has heretofore been proposed to employ an emergency valve device for controlling the fluid pressure brakes which is subject to brake pipe pressure and is normally in a position for establishing a direct communication from the brake valve to the brake cylinder, so that the brakes may be ordinarily applied and released by the direct supply and release of fluid to and from the brake cylinder upon manipulation of the brake valve.

Upon a sudden reduction in brake pipe pressure, through breakage of the brake pipe, manipulation of the brake valve, or otherwise, the emergency valve device is operated to supply fluid from the source of pressure directly to the brake cylinder to effect an emergency application of the brakes.

The principal object of my invention is to provide improved means for effecting the movement of the emergency valve device to release position after an emergency application of the brakes.

In the accompanying drawing, the single figure is a diagrammatic view, partly in section, of a fluid pressure brake equipment embodying my invention.

The fluid pressure brake equipment shown in the drawing comprises an emergency valve device 1 having a piston chamber 2 connected to an emergency brake pipe 3 and containing a piston 4 and a valve chamber 5, connected to a main reservoir 6 or other sources of fluid under pressure and containing a slide valve 7 adapted to be operated by piston 4.

The brake pipe 3 is connected to a brake valve 8 at each end of the car, if the car is provided with a double end equipment and a straight air pipe 9 leads from the brake valve and is connected in the normal release position of slide valve 7 through a cavity 10 with the brake cylinder 11.

For effecting the release of the brakes after an emergency application, a valve 12 adapted to be operated by a magnet 13 is provided. The valve 12 controls communication from valve chamber 5 through passage 14 to passage 15 which communicates with piston chamber 2 and a push button 16 is located near each brake valve 8 and is adapted when pressed to connect a source of current 16 with the magnet 13.

In operation, fluid is supplied from the main reservoir 6 and valve chamber 5, through the feed groove 18 to piston chamber 2 and thus charges the brake pipe 3 with fluid under pressure.

The brakes are normally applied by operating the brake valve 8 so as to supply fluid from the brake pipe 3 to the straight air pipe 9 and thence through cavity 10 in slide valve 7 to the brake cylinder 11.

Upon a sudden reduction in brake pipe pressure, the piston 4 is shifted to the extreme left and fluid is supplied from the main reservoir 6 directly to the brake cylinder 11, to effect an emergency application of the brakes.

In order to release the brakes after an emergency application, the push button 16 at the operating end of the car is pressed, so as to close the circuit through magnet 13. The energization of magnet 13 operates to open the valve 12, so that fluid under pressure is supplied from the main reservoir 6 to the piston chamber 2 and the brake pipe 3, thus equalizing the fluid pressures on opposite sides of the piston 4, so that the spring 19 operates to return the piston 4 and slide valve 7 to normal release position.

By employing the above described means for releasing the brakes after an emergency application, the use of an equalizing port through the emergency piston is dispensed with and thereby the possibility of leakage in case the brake pipe should become broken.

Similarly, in the so-called three pipe system having a main reservoir supply pipe connected to the brake valve, the breakage of the main reservoir pipe will not prevent the release of the brakes, when the present invention is applied.

Having now described my invention, what

I claim as new and desire to secure by Letters Patent, is:—

1. In a fluid pressure brake, the combination with a brake pipe, a source of fluid under pressure, and an emergency valve device having a piston subject to the opposing pressures of the brake pipe and said source of fluid under pressure, of electrically controlled valve means for controlling the admission of fluid from said source to the brake pipe to effect the release of the brakes.

2. In a fluid pressure brake, the combination with a brake pipe and a source of fluid under pressure, of an emergency valve device subject to the opposing pressures of the brake pipe and said source and operated upon a sudden reduction in brake pipe pressure for effecting an emergency application of the brakes and electrically controlled valve means for supplying fluid from said source to the brake pipe to effect the release movement of the emergency valve device.

3. In a fluid pressure brake, the combination with a brake pipe and a source of fluid under pressure, of an emergency valve device subject to the opposing pressures of the brake pipe and said source and operated upon a sudden reduction in brake pipe pressure for effecting an emergency application of the brakes, a valve for controlling the supply of fluid from said source to the brake pipe to effect the release movement of the emergency valve device, a magnet for operating said valve, and a push button for controlling the circuit of said magnet.

4. In a fluid pressure brake, the combination with a brake pipe and a source of fluid under pressure, of an emergency valve device subject to the opposing pressures of the brake pipe and said source and operated upon a sudden reduction in brake pipe pressure for effecting an emergency application of the brakes, a magnet controlled valve associated with said emergency valve device for controlling communication from said source of fluid under pressure to the brake pipe, and a push button for controlling the magnet circuit.

In testimony whereof I have hereunto set my hand.

CLYDE C. FARMER.